United States Patent [19]

Guido et al.

[11] Patent Number: 4,705,306

[45] Date of Patent: Nov. 10, 1987

[54] INJECTION LINE CONNECTION

[75] Inventors: Jurgen Guido, Borsig-Strasse 4, D-8402 Neutraubling; Norbert Binzer, Neutraubling, both of Fed. Rep. of Germany

[73] Assignee: Jurgen Guido, Fed. Rep. of Germany

[21] Appl. No.: 694,399

[22] PCT Filed: Apr. 18, 1984

[86] PCT No.: PCT/DE84/00092

§ 371 Date: Dec. 14, 1984

§ 102(e) Date: Dec. 14, 1984

[87] PCT Pub. No.: WO84/04566

PCT Pub. Date: Nov. 22, 1984

[30] Foreign Application Priority Data

May 9, 1983 [DE] Fed. Rep. of Germany ....... 3316979

[51] Int. Cl.$^4$ ............................................. F16L 19/04
[52] U.S. Cl. .................................. 285/332; 285/334.5; 285/385; 285/382.4; 29/512; 29/525; 29/DIG. 43; 123/469
[58] Field of Search .................. 285/332, 332.1, 334.5, 285/354, 381, 384, 385, 414, 415, 382.4; 29/157 R, 512, 525, 157.1 R, DIG. 43; 123/468, 469; 239/533.2, 533.3, 533.4, 533.5, 533.6, 533.7, 533.8–533.12, 600

[56] References Cited

U.S. PATENT DOCUMENTS

| 448,717 | 3/1891 | Hogan | 285/334.5 |
|---|---|---|---|
| 1,925,937 | 9/1933 | Schultis | 285/334.5 |
| 2,150,524 | 3/1939 | Starr . | |
| 2,445,702 | 7/1948 | Weyenberg et al. | 285/334.5 |
| 3,380,764 | 4/1968 | Wilson | 285/334.5 |
| 4,133,565 | 1/1979 | Shutt | 285/334.5 |

FOREIGN PATENT DOCUMENTS

| 528413 | 6/1931 | Fed. Rep. of Germany | 285/414 |
|---|---|---|---|
| 1937975 | 1/1972 | Fed. Rep. of Germany . | |
| 2138043 | 5/1974 | Fed. Rep. of Germany . | |
| 547776 | 12/1922 | France | 285/334.5 |
| 0712765 | 10/1931 | France . | |
| 1123749 | 9/1956 | France . | |
| 1238867 | 7/1960 | France | 285/334.5 |
| 1260967 | 4/1961 | France . | |
| 0008288 | of 1906 | United Kingdom | 285/385 |
| 0001756 | of 1913 | United Kingdom . | |
| 0460763 | 2/1937 | United Kingdom . | |
| 884949 | 12/1961 | United Kingdom | 285/334.5 |
| 0888055 | 1/1962 | United Kingdom . | |

OTHER PUBLICATIONS

German Patent Publication; Product Specification DIN 73365 of Jan. 3, 1970.

Primary Examiner—Gary L. Smith
Assistant Examiner—Eric K. Nicholson
Attorney, Agent, or Firm—Baker, Maxham & Jester

[57] ABSTRACT

An injection line connection for internal combustion engines having for each pressure connection a connecting fitting which hitherto was upset out of the material of the injection line but which is still defective and which can be pressed by a cap nut, by way of a pressure ring, against an internal taper portion of a connecting member which carries the cap nut, is also suitable for thinner injection lines, free of disadvantages, by virtue of the following features, some of which are known and which are reproduced here by way of abstract:

(a) the injection line (1) is a wall thickness in the range of from 1/5 to ⅓ of its outside diameter (D);

(b) each pressure ring (6) is provided with a support projection (10) which is rounded off at the end towards the connecting fitting and which is of a tapered configuration along its outside periphery, while the associated connecting fitting (3) comprises the end of the injection line (1) which is flanged over outwardly about the support projection (10) and there forms the sealing taper portion (9);

(c) the outside diameter ($d_a$) of each ring (6) is about 1.8 to three times the outside diameter (D);

(d) each support projection (10) is of an axial length (L) which is in the range of the wall thickness (s) of the injection line (1), and a wall thickness (w') which is at least about ¼ of the outside diameter (D).

7 Claims, 4 Drawing Figures

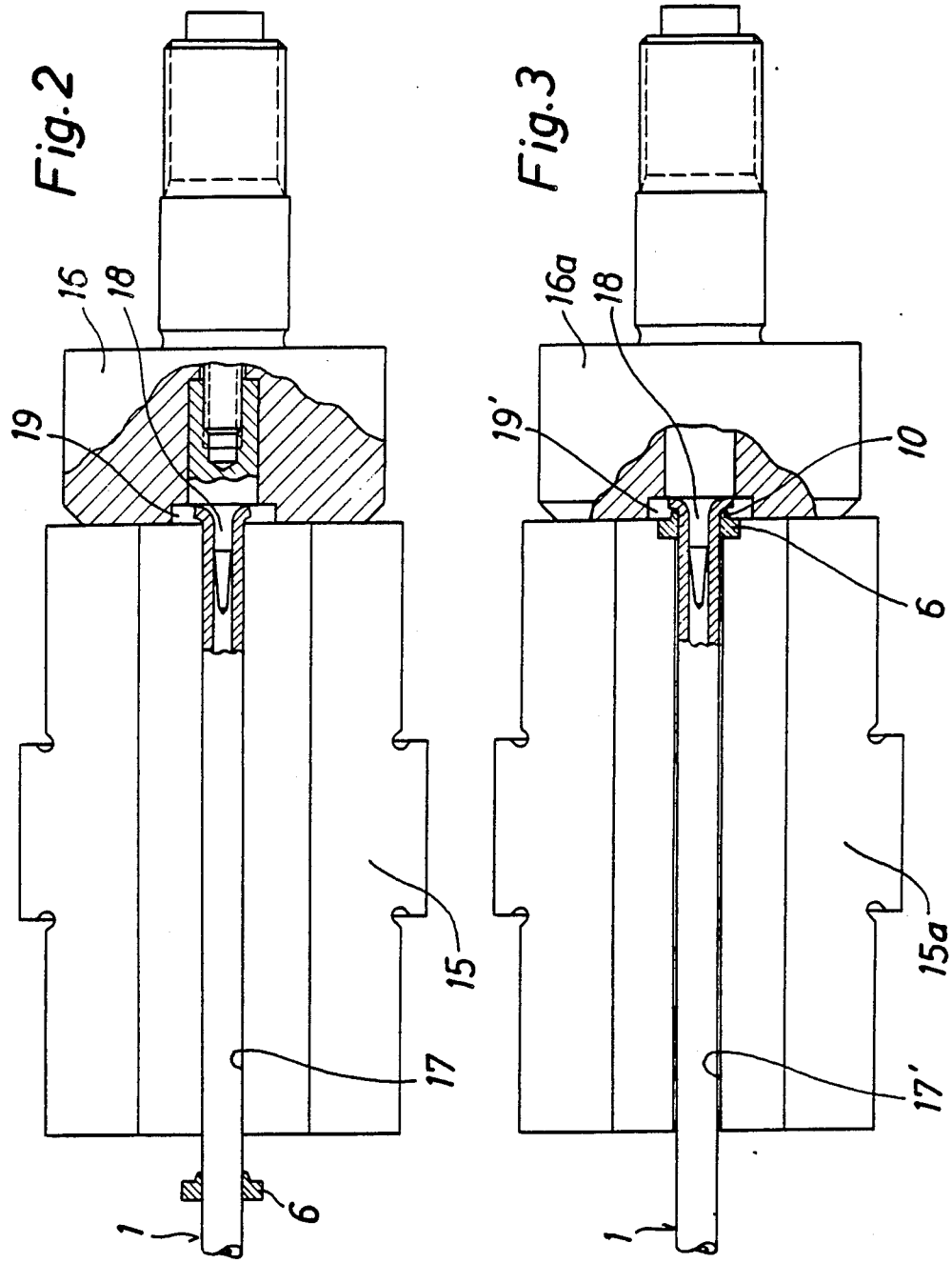

INJECTION LINE CONNECTION

FIELD OF THE INVENTION

The invention relates to an injection line connection for internal combustion engines, as set forth in the classifying portion of claim 1, and a production process for a connecting fitting of a pressure connection thereof.

DISCUSSION OF THE PRIOR ART

As fuel is generally supplied to the individual operating cylinders of internal combustion engines under a considerable pressure, which in the case of diesel engines, may be several hundreds typically more than 500 of bars, considerable screwing forces have to be applied to the cap nuts of the pressure connections of the injection line connections which are involved therewith, so as to ensure a reliable seal between the external sealing taper of each connecting fitting and the internal taper portion of the associated connecting member. In that connection, it should be borne in mind that the injection lines which always have to have a plurality of curves in going from the injection pump to the associated injection nozzle on the operating cylinder of the internal combustion engine are only made of soft, non-alloyed, low-strength steel, and even local hardening of that material at the connecting fittings formed thereon cannot be permitted. If it were relatively hard, the material of the injection line, extending from the hardened connecting fitting, could not experience adequate resilient flexing in relation to the inevitable vibrations of the injection line when the internal combustion engine is running, so that those connecting locations could easily constitute the sources of vibration fractures. To achieve connections, which remain tight even during running conditions of the engine with strong pulsating pressure strains within the injection lines, it is necessary to apply so high sealing pressures at line connections that the material of the connecting fittings undergo first deformations. It has therefore been necessary to accept that the connecting fitting which is clamped between the cap nut and the connecting member of each pressure connection suffers from deformation when an injection line is repeatedly removed and fitted, with the result that such deformation prevents a satisfactory seal from being made and thus eventually renders the entire injection line useless. Another factor which has a detrimental effect is that, when the cap nuts are tightened, besides the axial compression loading, the material of the nipple is also subjected to a frictional loading which acts in its peripheral direction and which results in the fitting suffering from additional wear. Finally, when an injection line is fitted and removed on a number of occasions, its internal diameter becomes constricted at the ends thereof because of the radial forces generated by the hollow taper portion of the connecting member.

In accordance with the state of the art disclosed in British Pat. No. 888 055 (see also French Pat. No. 1 260 967) and also Product Specification sheet 73365, sheet 3 of January 1970, in order to avoid the last-mentioned wear phenomenon, a pressure ring which is of harder material than the injection line is provided within the cap nut, between the inner annular shoulder thereof and the rearwardly facing contact surface of the connecting fitting, in the hope that, when the cap nut is tightened, the pressure ring would remain bearing firmly against the connecting fitting and only the cap nut would be rotated relative to the pressure ring. If such rings also afford a good hard support for the cap nuts and make it possible for the comparatively large cap nuts which are conventionally employed nowadays on injection pumps and injection nozzles also to be used in conjunction with injection lines of small diameter, experience has shown however that, when tightening the cap nut, it is scarcely possible to prevent the ring, which generally bears against the inner annular shoulder of the cap nut over a larger area than at the rearward contact surface of the connecting fitting, from being rotated with the cap nut. When that happens, however, not only does the arrangement still suffer from the disadvantage of rapid wear of the connecting fitting, but in addition the inner circular edge of the pressure ring, which is towards the connecting fitting, when such relative rotary movements occur, can also result in undesirable notching or scoring of the injection line at the point of connection of the connecting fitting, thereby promoting the formation of notch cracks at that point. Replacing the members that are referred to as solder nipples (see the above-mentioned DIN sheet), which increase the cost of production of the connecting fitting and which endanger operational reliability because of the solder residues that are left behind, by connecting fittings which are formed by an upsetting operation, was faced with the fresh problem that upsetting a fitting, in the otherwise extremely smooth inside surface of the line (with a depth of roughness of only 3 to $5\mu$), results in a squeeze or pinch fold which increases the width of the internal cross-section of the line and which in turn can result in fouling at that point and defective operation of the engine due to cavitation.

In an injection line connection in accordance with the classifying portion of claim 1, as disclosed in U.S. Pat. No. 2,150,524, the pressure ring is prevented from rotating when the cap nut is tightened, by the pressure ring being fixedly connected by a press fit to the connecting fitting which is formed by upsetting on the injection line, and the adjoining portion of the injection line. However, the last-mentioned pressure connections and similar connections with so-called ball fittings (see German Pat. No. 1 937 975 and its addition German Patent Publication No. 2 138 043), which are also formed by upsetting on the injection line, are still unsatisfactory not just because of the pinch fold caused by the upsetting operation, but also for the following reasons:

For the purposes of forming the ball fitting by an upsetting operation, the injection lines must be of sufficient wall thickness as otherwise there is insufficient material available for the upsetting operation. With the injection lines which are conventionally used nowadays and which are also suitable for very high diesel engine injection pressures, outside diameters D of 6 mm and wall thicknesses s of 2 mm are conventional, so that there is sufficient material available for the operation of upsetting suitable ball fittings. Nevertheless, it has been found that lower injection pressures are adequate for many other kinds of internal combustion engines, for example, for petrol injection engines and so-called pre-combustion chamber diesel engines for private vehicles, and thus injection lines of smaller wall thicknesses would also be adequate if there would then still be sufficient material available for a connecting fitting formed thereon. Instead of the above-mentioned ratio $D:s=3:1$, it would then be possible to use such ratios of 3.5:1, while in the case of injection lines for even lower pressures, as are used in petrol injection in the intake stroke phase of a cylinder of an internal combustion engine, it would be possible to use ratios of up to about 5:1. With an increase in that ratio, in spite of the internal cross-section of the injection lines remaining the same, the lines can be produced more easily and more cheaply and are at the same time less liable to fracture because of their correspondingly higher degree of flexibility, in relation to the vibrational loadings which occur in operation. The improvement in the capacity to absorb vibrations also makes it possible to reduce the damping expenditure which is required in present-day conventional injection lines while the higher degree of flexibility also makes it easier to adjust the injection time of the injection pump, by virtue of the ease of rotation thereof. Finally, the greater degree of flexibility of the thinner injection line also permits a lower degree of bending accuracy when fitting the line between the injection pump and the associated injection nozzle of the internal combustion engine.

French Pat. No. 1 123 749 also discloses such pressure connections for injection lines, with pressure rings which are supported on the one hand against an internal flat annular shoulder of a cap nut, the rings being braced by means of enlarged tapered openings at the connecting fitting side, against correspondingly tapered rearwardly facing contact surfaces of the associated connecting fitting. That arrangement makes it possible to counter the danger of notch cracking at the location at which the connecting fitting is connected to the injection line, by virtue of the fact that suitably small taper angles of for example 30° are used in the ring and at the rearward contact surface of the connecting fitting. Apart from the fact that, when the connecting fitting is formed by upsetting, an internal pinch fold is also formed, which is a disadvantage, there is also the problem that, when the cap nut is tightened, such taper surfaces apply such high constricting forces to the fitting that, when the cap nut is firmly tightened up, it must be reckoned on the internal cross-section of the line being restricted. This results in a corresponding impairment in the injection action and thus the operation of the engine, and thus also resulting in a lower quality of exhaust gases, at least when injection lines of smaller wall thicknesses are used, as described hereinbefore.

Finally, all pressure connections of injection lines which project into the tapered receiving space in the connecting member, by means of an end surface on a connecting fitting which is formed by the injection line being cut to length, suffer from the common disadvantage that it is scarcely possible to form such a clean and smooth surface at that end face of the connecting fitting, as on the injection line itself. Therefore it must also be reckoned at this point that very fine particles which remained behind after the cutting operation come loose in operation of the internal combustion engine, and result in defects in the extremely sensitive injection valves.

SUMMARY OF THE INVENTION

Starting from the classifying portion of claim 1, the present invention is based on the problem of so developing the injection line connection together with the pressure connections thereof, that as far as possible all the above-indicated deficiencies are overcome, and the injection lines can be reliably secured in position and sealed by way of a connecting fitting or nipple which bears against the internal taper portion of each connecting member, this construction avoids internal pinch folds without the risk of constricting the injection line at the point of fixing thereof, and also without the danger of subsequent contamination of the fuel being conveyed by particles of material or dirt which come loose from the injection line.

In accordance with the invention, starting from the classifing portion of claim 1, the problem set is solved by the features recited in the characterising portion thereof, of which the first two are known per se.

It has surprisingly been found that the operation of externally flanging or beading over a pressure or thrust ring which is provided with a support projection or rim with the end of a line, that operation being known per se from British Pat. No. 1756/1912 on line connections in boiler design with line wall thicknesses of only about 1/10 of their outside diameter and pressures of only about 1/10 of the pressure range with which this invention is concerned can also be carried out without forming cracks in the material of the line, in relation to injection lines of the type to which this invention is addressed, with wall thicknesses of from 1/5 to $\frac{1}{3}$ of their outside diameter, as are known for example from British Pat. No. 460 763, and, in conjunction with conventional connecting members, also results in pressure connections which withstand very high pulsating operating pressures of more than 500 bars, when at the same time the further features of above-mentioned claim 1 are fulfilled.

As the support projections on the pressure rings, as disclosed in British Pat. No. 1756/1912, have only small taper angles in the range of from 30° to 45° at their tapered outside surfaces, that arrangement gives really long support projections which are of thin cross-section and which are unable to withstand substantial constriction forces when a cap nut is tightened. Even if that may be permissible and even desirable in connection with steam boilers, because a certain degree of elasticity of the pressure rings permits axial movement of the connecting fitting in the internal taper portion of the connecting member in the event of thermal expansion of the pressure pipe, such pressure connections are however totally unsuitable for the injection lines with which we are concerned here, with injection pressure of up to more than 500 bars, and would never provide a useful, tight pressure connection. It is therefore understandable that, in spite of the problem of providing suitable, highly loaded pressure connections in injection lines having already been in existence for more than 70 years, the men skilled in the art were unable to find any stimulus towards the present invention, from that art.

In comparison, on the one hand, the dimensioning of the thrust rings and the support projections, being substantial in relation to the surface area which is subjected to the loading of the injection pressure and which is proportional to the outside diameter of the injection line, and on the other hand, the comparatively very short dimension of the support projections, ensure that, in the injection line connection according to the invention, no constriction effect can be produced at the connecting fittings. That is in spite of the constriction force which occurs at the sealing taper portion of any connecting fitting and thus also at any support projection. At the same time, the fact that the material of the line is beaded over around the support projection results in such a large, wedge-like contact surface for the thrust ring against the injection line, with such a large mean diameter, that there is no longer any need to fear that the ring will be entrained by the cap nut in its rotary movement when it is tightened. There is also the advantage that all sealing surfaces of the connecting fitting of the injection line are formed by the internal surface thereof, which, as referred to above, is particularly smooth, and thus reduces the danger of the fuel being contaminated, in comparison with present-day conventional connecting fittings. Therefore, the proposed connecting fitting can be cleaned better than the present-day conventional fittings, including subsequently, because there are no punch folds which constitute roughness in the internal surfaces.

The invention also embraces an advantageous process for producing a connecting fitting on an injection line of the injection line connection according to the invention. The further use of the die of the pressing apparatus which is required for bending over the free end of the injection line, as an associated pressure or thrust ring which remains firmly connected to the injection line, results in the desired firm press fit of the ring on the injection line, at the stage when the free end thereof is being bent over. In addition it is possible to forego a separate die, which, with the frequent use of the pressuring apparatus that is required, would be subject to inevitable wear and would therefore have to be frequently replaced.

Although U.S. Pat. No. 2,150,524 discloses a similar multistage process, that process is only used for axially upsetting connecting nipples and, by virtue of the very thick-walled injection line used therein, could not give any stimulus to flanging or beading over a pressure or thrust ring which is moreover of an entirely different configuration.

Other advantageous embodiments of the invention are characterised in further article claims and further process claims.

BRIEF DESCRIPTION OF THE DRAWINGS

The invention is illustrated by way of example in the drawing in which:

FIG. 2 is a view, partly in axial section and partly in a side view, which is less enlarged than the view shown in FIG. 1, of the pressing tools of a pressing apparatus which accommodates the end of a fuel injection line as shown in FIG. 1, for the purposes of forming a flange thereon, after carrying out a first working operation for flanging over the end of the line, FIG. 3 shows the same view of the pressing apparatus, but with a pressure or thrust ring used as a die, after carrying out a second working operation.

DESCRIPTION OF THE PREFERRED EMBODIMENTS

Figure 1:
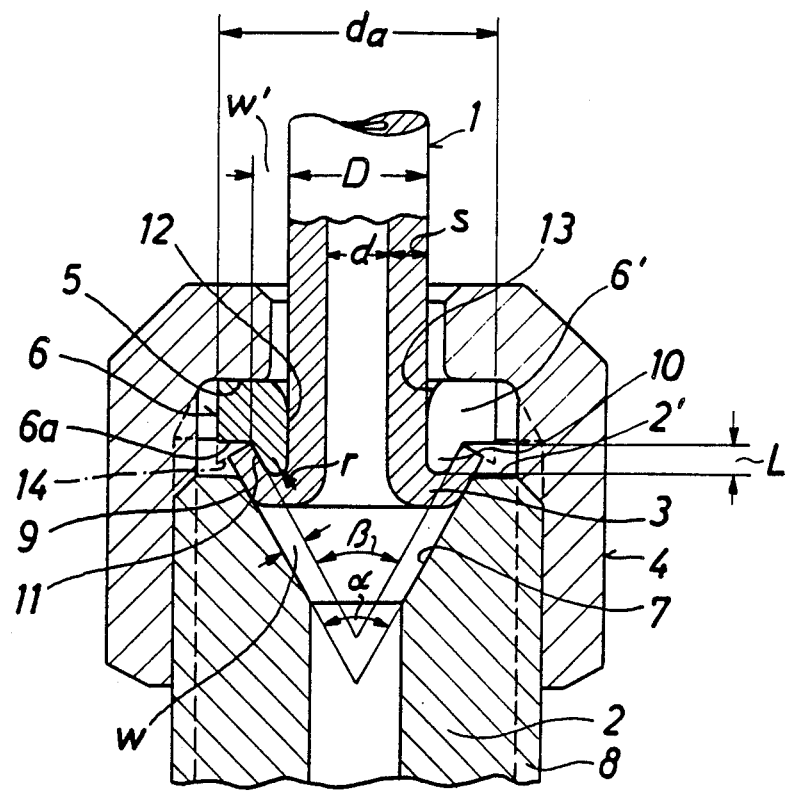
FIG. 1 shows a view in axial section of an enlarged scale of an embodiment of the injection line connection at the location of a pressure connection.

The injection line connection shown in FIG. 1 is, of a construction which is generally conventional and therefore not shown in greater detail, for connecting a pressure connection of a fuel injection pump of a precombustion chamber diesel engine to an associated injection nozzle on the cylinders of the engine. The connection has an injection line 1 with an outside diameter D of 4.0 mm, a wall thickness s of 1.0 mm and thus an internal width d of 2 mm. The injection line is connected at its two ends by way of respective pressure connections as shown in greater detail in FIG. 1, with the connection member 2, on the one hand to the injection pump and on the other hand to the injection nozzle. As neither the injection pump nor the injection nozzle is subject-matter of the present invention and as both may correspond to any generally conventional design, there is no need for them to be illustrated and described in greater detail herein.

The end of the injection line 1 which is towards the pump connection forms a connecting nipple or fitting 3 which is described in greater detail hereinafter. The connecting fitting 3 is sealingly and at the same time alignedly pressed by a cap nut 4, by way of a pressure or thrust ring 6. The thrust ring is supported on the one hand against an inner flat annular shoulder 5 of the cap nut 4 and on the other hand against a rearward contact surface of the connecting fitting 3. The ring 6 is of a material that is harder than the injection line 1. Connecting member 2, which is formed with internal taper portion 7, carries the cap nut 4 on a correspondingly male screw thread 8 connecting fitting 3 has a sealing taper 9 which is adapted to and bears against the taper angle α of 60° of the internal taper portion 7 and bears against fitting 3. The ring 6 also extends radially over the connecting member 2, beyond the taper opening thereof.

The ring 6 comprises a shaped strip or band which is cut to length and which is rolled into the form of a ring, forming a division or gap as indicated at 6'. The ring 6 is fixedly connected by a press fit to the connecting fitting 3 and its outside diameter $d_a$ is about twice the outside diameter D of the injection line 1. It is provided with an annular support projection or rim portion 10 at the side towards the connecting fitting 3. The edge of the cross-section of the ring, towards the connecting fitting 3, is rounded off at a radius r of about 0.5 mm. In addition, from its root, the support projection 10 has a tapered external peripheral surface 11, the taper angle β of which is in the range of the taper angle α of the internal taper 7 of the connecting member 2.

As will be noted, the connecting fitting 3 comprises the free end of the injection line 1, which is flanged or beaded over outwardly around the support projection 10 and which at the same time forms the sealing taper 9 on its outside. In that connection, each support projection 10, as measured from the root end of the portion of the injection line 1 which encloses same, is of an axial length L which is in the range of the wall thickness s of the injection line 1, and a wall thickness w' which is about ¼ of the outside diameter of the injection line 1.

At its end which is remote from the support projection 10, the bore 12 of the ring 6 has a trumpet-like enlargement portion 13, which ensures that the injection line 1 which extends rearwardly from the ring 6 at that point could not suffer vibration failures and notching at its sharp edge at that location at the discharge opening of the bore 12, under the effect of vibration which occurs in operation. In addition, the end portion of the injection line 1, which is flanged over outwardly about the support projection 10, is a wall thickness w which is smaller than the wall thickness s of the injection line 1.

An abutment shoulder 14 of ring 6 is of a hollow conical configuration, as shown in broken lines in FIG. 1, projects perpendicularly outwardly in the cross-section of the ring the point of origin from the point of origin of the outer peripheral surface 11 of the support projection 10 when screwing on the cap nut 4, the material of connecting fitting 3, which is deformed outwardly beyond support projection 10, is further deformed until the outer edge or free end of connecting fitting 3 abuts against abutment shoulder 14 of ring 6, whereafter any further tightening of cap nut 4 is opposed by a sudden increase in resistance which is higher than admissable torque as set, for example, on a torque wrench. Thus, the torque permitted when screwing on cap nut 4 can be reliably limited. That effect can also be achieved if the end of the injection line 1, which is used to form the connecting fitting 3, is of a corresponding long dimension, by means of the material of the injection line 1 which is deformed outwardly beyond the support projection 10, engages flat annular shoulder 6a which adjoins projection 10 in an outward direction from the point of origin of the peripheral surface 11. Such outwardly deformed material of the injection line 1 then forms the outer edge of the connecting fitting 3 at that point. If, with such a configuration in respect of the connecting fitting 3, the cap nut 4 is tightened up, then ultimately the outer end face 2' of the connecting member 2 bears against the above-mentioned circular outer edge of the connecting fitting 3, whereafter any further tightening of the cap nut 4 is opposed by a sudden increase in resistance which is also higher than admissible torque as set, for example, on a torque wrench.

The outside diameter $d_a$ of the ring 6 provides a large wall thickness and, in the opening of the cap nut 4, could amount approximately to three times the outside diameter D of the injection line 1. The equally large wall thickness w', at the root portion of the support projection 10, which, at the outer end of its outer peripheral surface 11 which is enclosed by the flanged-over end of the line, is about ¼ of the outside diameter D of the injection line 1 and could be even larger. The above factors, in conjunction with the comparatively short axial length L of the support projection 10, which is in the range of the wall thickness s of the injection line 1, are important for the reason that the high operating pressure which occurs in the injection line (up to more than 500 bars), and the operating vibrations of internal combustion engines, make it necessary to have considerable axial tightening forces at the connections with which we are concerned here, in order in operation to ensure a satisfactory seal. With those pressures which in any case could already result in plastic deformation of the material at the outer sealing taper portion 9 of the connection fitting 3, pressure or thrust rings of smaller dimensions and weaker and/or longer support projections would result in axial constriction of the support projection 10 and even the ring 6 itself. This would thus also result in constriction of the injection line, which cannot be in any way allowed, because of the trouble that that would cause in the injection operation. In comparison, the above-described configuration of the ring 6, together with its support projection 10 and the connecting fitting 3, ensures that the pressure connection can be repeatedly used, while giving a satisfactory seal, and, in that connection, the cap nut 4 can also be tightened with an excessive torque, without any fear of constricting the injection line.

Figure 4:
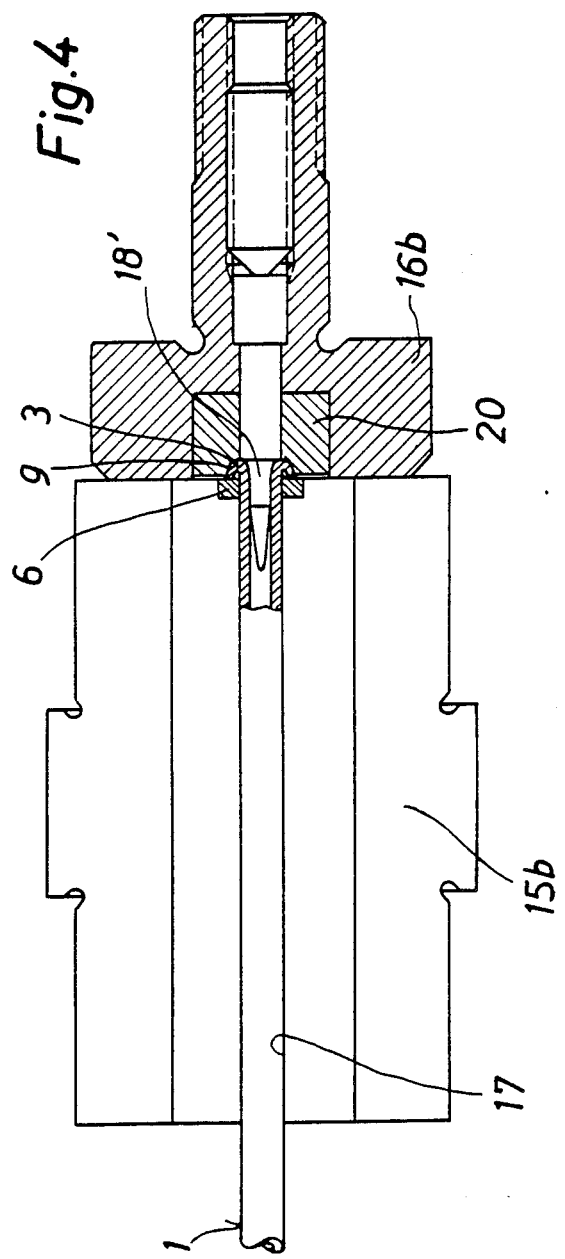
FIG. 4 shows the same pressing apparatus after carrying out a third working operation, and thus after finishing the connecting fitting which is flanged over around the ring.

FIGS. 2 through 4 show a preferred manner of manufacturing the connecting fitting or nipple 3 shown in FIG. 1, by means of a pressing apparatus, in three working operations. A die which is used in the second and third operations for flanging or beading over the end of the injection line 1 is so firmly pressed together in the third operation, to the end of the injection line 1, which is turned over around the support projection 10 on the die, that the die now remains on the injection line 1, as a lost tool, and there forms the ring 6 which remains fixedly connected to the connecting fitting 3.

For the three working operations, the pressing tool has different die portions 15, 15a and 15b which each comprise two half shell members, and also different pressing punch members 16, 16a and 16b. The die portion 15 for the first working operation only requires a bore 17 which receives and at the same time grips the injection line 1. The pressing punch member 16 required for the first working operation is provided not only with a mandrel 18 which is rounded off at its base, corresponding to the flanged-over configuration of the injection line 1, and which, after the pressing operation, still penetrates into the injection line 1 to a comparatively great depth, but also with a recess 19 to permit the flanged-over end of the line to be accommodated therein.

The die portion 15a which is used for carrying out the second working operation accommodates a pressure or thrust ring 6 which serves as a die, in an enlarged portion, that is towards the punch member, of its bore 17' which accommodates the injection line 1 with clearance. As shown in FIG. 2, the ring 6 was already fitted on to the injection line 1 before beginning the operation of flanging over the end thereof, and is now pushed up to the flanged-over end of the line and has its support projection 10 projecting out of the die portion 15a as can be seen from FIG. 3, on the punch member side of the arrangement. In this case, around the mandrel 18, the pressing punch member 16a has a recess 19' which is deeper than the recess 19 of the punch member 16 by the axial length of the support projection 10. At the end of the pressing operation which is envisaged herein and thus when the end face of the punch member 16a is bearing against the co-operating surface of the die portion 15a, the flanged-over end of the injection line is just firmly pressed against the free end of the support projection 10. In that connection, the clearance between the bore 17' and the injection line 1 serves to permit the injection line 1 to be correspondingly axially displaced in the pressing operation.

The die portion 15b for carrying out the third operation accommodates the injection line 1 together with the ring 6, once again without any clearance, so that, in this severest pressing operation, no material of the injection line 1 can escape outwardly behind the ring 6. In this case, the punch member 16b is provided at its end, and around a somewhat modified mandrel 18', with an insert member 20 which is recessed to correspond to the internal taper 7 of a connecting member 2 so that the flanged-over part of the injection line 1, at the end of this operation, at the same time forms at its outside surface a sealing taper 9 which is matched to the internal taper 7.

In the illustrated embodiment, the radio D:s of the injection line is about 4:1 although that ratio could also be in the range of from 3:1 to 5:1, depending on the respective requirements involved. The taper angle $\alpha$ of the internal taper 7 of the connecting member 2, which is shown as being 60° in the illustrated embodiment, corresponds to a value which has been successful in practice, but it could also differ from that value by an amount of up to ±19°. The outside diameter $d_a$ of the pressure ring could also be in the range between about 1.8 times to about three times the outside diameter D of the injection line 1.

In addition, the radius r of the edge of the support projection 10, which is towards the connecting fitting, being specified at about 0.5 mm in the illustrated embodiment, could be in a range of from about 0.2 to 0.4 times the wall thickness s of the injection line. It is also possible, in accordance with the invention, for the ring 6, instead of being made from a profiled strip or band which is cut to length and rolled into a ring form by means of a piece of equipment, forming a gap in the ring, to be produced by a machining operation or by a non-cutting operation in the form of a ring which is closed in a seamless construction, more specifically, being turned out of the solid or being produced as a cold pressed member from wire in the solid by a cold pressing operation. If the wall thickness w of the end portion of the line, which is flanged over around the support projection 10, such wall thickness w being smaller than the wall thickness s of the injection line 1, is already produced of itself with the above-described operation of turning over the end portion of the line around the support projection 10, nonetheless the invention is not bound to the illustrated reductions in wall thickness of the above-mentioned end portion. Furthermore, the invention also covers injection lines of larger diameters than 4.0 mm, insofar as they are suitable for fuel injection in internal combustion engines.

The invention is also not bound to a press fit connection in respect of the pressure ring 6 to the injection line 1. Even if such a mode of connection is preferred, in order reliably to ensure that, when the cap nut 4 is tightened, the ring 6 is not rotated therewith, thereby avoiding wear from occurring on the injection line 1, nonetheless the tapered peripheral surface 11 of the support projection 10 already provides such a large outside contact surface for the ring 6 on the connecting fitting 3 that, even without a press fit, there is generally no need to fear that the ring 6 will be entrained by the cap nut 4 when it is turned.

Even if the invention is generally directed to an injection line connection with the same pressure connections at both ends of the injection line, the scope of protection of the present invention nonetheless also embraces such an injection line which, for any reason whatever, is provided with the described and illustrated pressure connection only at one end thereof.

We claim:

1. A pressure connection for at least one end of an injection line for internal combustion engines, said pressure connection comprising:
   a connection fitting formed as a flanged-over portion of the free end of the injection line;
   a pressure ring formed of a material which is harder and less flexible than the material of the injection line, said ring having a rearward contact surface and a forward annular support projection which is rounded off at its free end toward said connecting fitting and has a tapered outer peripheral surface, said flanged-over portion of said connecting fitting enclosing said support projection;
   a sealing taper formed on the outer surface of said flanged-over portion of said connecting fitting, said sealing taper having an angle corresponding to the angle of said tapered outer peripheral surface;
   annular abutment means extending outwardly on said ring and engaging the free end of said flanged-over portion of the injection line in abutting relationship;
   a connecting member having external threads and an internal taper for sealingly engaging said sealing taper formed on the outer surface of said flanged-over portion;
   a cap nut having internal threads engageable with said external threads on said connecting member and having an inner annular shoulder for contacting said rearward contact surface of said ring;
   whereby said cap nut is threaded onto said connecting member and tightened down, said connecting member positively and sealingly engages the sealing taper of the flanged-over portion of said connecting fitting, said ring and flanged-over end are forced together with said free end of the injection line being deformed toward said annular abutment means to thereby suddenly increase the resistance against a further tightening rotation of said cap nut when said free end abuts said annular abutment.

2. A pressure connection for connecting a free end of an injection line (1) having an axis to a connecting member (2) for use in internal combustion engines, said pressure connection comprising:
   a connecting fitting (3) formed from the material of said injection line (1) at said free end thereof;
   a pressure ring (6) made of a material which is harder than the material of said injection line, said pressure ring having an annular support projection (10) which, in cross-section, is rounded off at the edge adjoining said free end of said injection line, the outer peripheral surface (11) of said support projection having a taper angle $\beta$, said connecting fitting being rolled over said support projection outwardly from the axis of said injection line onto said outer peripheral surface, the inner surface of said free end of said injection line forming an external sealing taper (9) overlying said peripheral surface, said pressure ring (6) being fixedly connected by a press fit to said connecting fitting (3) and to the adjoining portion of said injection line (1), said pressure ring having a first annular shoulder axially spaced from and on the opposite side from said support projection and a shoulder extending radially beyond said support projection and said connecting fitting and forming annular abutment means (6a, 14) facing in the same direction as said free end of said injection line;
   a cap nut (4) adapted to threadedly engage said connecting member (2), said cap nut having an inner annular shoulder (5) and axially supporting said first annual shoulder of said pressure ring, said connecting member having an internal taper opening (7) having a taper angle $\alpha$ into which said connecting fitting is seated, said taper 60 angles $\alpha$ and $\beta$ being generally similar so that when said cap nut is tightened onto said connecting member, said pressure ring is forced axially into said connecting fitting and said connecting fitting is forced into said taper opening in said connecting member thereby forming a seal therebetween, said radially extending shoulder of said pressure ring extending beyond said connecting member taper opening;
   the wall thickness (s) of said injection line (1) being in the range of 1/5 to ½ the outside diameter (D) of said injection line;

the outside diameter ($d_a$) of said pressure ring being in the range of about 1.8 to 3 times said outside diameter (D);

said support projection (10) measured from its origin at the main portion of said ring (6) at abutment means (6a, 14), having an axial length (L) of a dimension similar to wall thickness (s) and a radial wall thickness (w') that is at least ¼ the outside diameter (D); and said free end of said injection line comprising said connecting fitting engages said annular abutment (6a, 14) means when said cap nut (4) is tightened down, thereby positively limiting torque on said cap nut.

3. An injection line connection according to claim 1 or 2 characterised in that, at the side toward the connecting fitting, said annular abutment means comprises a radially flat annular shoulder (6a) which extends outwardly from the origin of the outer peripheral surface (11) of its support projection (10).

4. An injection line connection according to one of claims 1 or 2 characterised in that said annular abutment means comprises a hollow-conical abutment shoulder (14) which projects outwardly in the annular cross-section perpendicularly to the conical peripheral surface (11) from the origin of the outer peripheral surface (11) of its support projection (10).

5. An injection line connection for internal combustion engines with pressure connections at the ends of the injection line and, for each pressure connection, a connecting fitting which is formed from the material of the injection line and which can be sealingly and at the same time axially pressed by a cap nut, by way of a pressure ring which is of a material that is harder than the injection line and which is supported axially in one direction against an inner flat annular shoulder of the cap nut and axially in the other direction against a rearward contact surface of the connecting fitting and which at least bears inwardly against the injection line, against an internal taper portion of a connecting member which carries the cap nut on a corresponding male screwthread, with a sealing taper portion similar to the taper angle of the internal taper portion of about 60°, wherein the ring also extends over the connecting member beyond the taper opening thereof, characterised by the following features:

(a) the injection line (1) has a wall thickness (s) in the range of from 1/5 to ⅓ of its outside diameter (D);

(b) each ring (6) is provided at the side towards the connecting fitting with an annular support projection (10) which has an annular cross-section that is rounded off at the edge that is toward the connecting fitting and, along its outside periphery, a tapered outer peripheral surface (11) with a taper angle ($\beta$) similar to taper angle ($\alpha$) of the internal taper (7) of the associated connecting member (2) while the associated connecting fitting (3) comprises the free end of the associated injection line (1), which is flanged over outwardly around the supporting projection (10) on the peripheral surface (11) thereof and which with its outer periphery at the same time forms the sealing taper (9);

(c) the largest diameter ($d_a$) of each ring (6) is about 1.8 to three times the outside diameter (D) of the associated injection line (1);

(d) each support projection (10), as measured from its origin at the main portion of said ring (6) at abutment means (6a, 14), is of an axial length (L) that is approximately equal to wall thickness (s) of the injection line (1) and a wall thickness (w') that is at least about ¼ of the outside diameter (D) of the injection line (1); and (e) annular abutment means on said ring (6) which engages said flanged-over free end of said injection line when said cap nut is tightened down, thereby limiting torque on said cap nut, said annular abutment means comprising a hollow-conical abutment shoulder (14) which projects outwardly in the annular cross-section perpendicularly to the conical peripheral surface (11) from the point of origin of the outer peripheral surface (11) of its support projection (10).

6. An injection line connection according to claim 5, wherein said ring (6) is fixedly connected by a press fit to said connecting fitting and to said adjoining injection line.

7. A process for producing a connecting fitting for connecting the free end of an injection line to a threaded connecting member for use in internal combustion engines, the fitting comprising a pressure ring made of a material which is harder than the material of the injection line, said pressure ring having an annular support projection extending axially along the injection line adjacent the free end thereof, the support projection being rounded and having an outer peripheral surface having an angle $\beta$, said pressure ring having a first annular shoulder axially spaced from and on the opposite side form the support projection and a shoulder extending radially beyond the support projection and forming annular abutment means facing oppositely from said first annular shoulder, a threaded cap nut configured to engage the connecting member threads and having an inner shoulder to bear against said first annular shoulder of said pressure ring, the connecting member having an internal taper opening with a taper angle $\alpha$ generally similar to tape angle $\beta$, said process comprising the steps of:

positioning the pressure ring around the injection line adjacent the free end thereof;

placing the injection line and pressure ring in a pressing tool;

flanging over the free end of the injection line around the rounded support projection of the pressure ring in a plurality of sequential steps with respective pressing punch members which are successively moved with a respective mandrel into the free end of the injection line, the pressure ring forming a lost die of the pressing tool, thereby forming a press fit between the pressure ring and both the injection line and connecting fitting;

the pressure ring and flanged-over free end forming the connecting fitting and being tightly confined between the cap nut and the connecting member when they are threadedly engaged and tightened down, the free end of the injection line being thereby deformed so as to abut the abutment means and suddenly increase the resistance to further tightening of the cap nut on the connecting member.

* * * * *